(12) United States Patent
Hartig

(10) Patent No.: US 7,241,506 B2
(45) Date of Patent: Jul. 10, 2007

(54) CORROSION-RESISTANT LOW-EMISSIVITY COATINGS

(75) Inventor: Klaus Hartig, Avcoa, WI (US)

(73) Assignee: Cardinal CG Company, Eden Prairie, MN (US)

( * ) Notice: Subject to any disclaimer, the term of this patent is extended or adjusted under 35 U.S.C. 154(b) by 0 days.

(21) Appl. No.: 10/862,770

(22) Filed: Jun. 7, 2004

(65) Prior Publication Data

US 2005/0008852 A1 Jan. 13, 2005

Related U.S. Application Data

(60) Provisional application No. 60/477,302, filed on Jun. 10, 2003.

(51) Int. Cl.
*B32B 17/06* (2006.01)
(52) U.S. Cl. .................... 428/432; 428/428; 428/433; 428/434; 428/697; 428/698; 428/699; 428/701; 428/702; 428/704
(58) Field of Classification Search ............... 428/428, 428/432, 433, 434, 697, 698, 699, 701, 702, 428/704
See application file for complete search history.

(56) References Cited

U.S. PATENT DOCUMENTS

| | | | |
|---|---|---|---|
| 4,488,775 A | 12/1984 | Yamamoto | 350/164 |
| 4,639,069 A | 1/1987 | Yatabe et al. | 350/1.7 |
| 4,960,310 A | 10/1990 | Cushing | 350/1.7 |
| 5,143,796 A | 9/1992 | Sebastiano et al. | 428/623 |
| 5,296,302 A | 3/1994 | O'Shaughnessy et al. | 428/472 |
| 5,302,449 A | 4/1994 | Eby et al. | 428/336 |
| 5,337,191 A | 8/1994 | Austin | 359/885 |
| 5,506,037 A | 4/1996 | Termath | 428/216 |
| 5,589,280 A | 12/1996 | Gibbons et al. | 428/626 |
| 5,595,825 A | 1/1997 | Guiselin et al. | 428/428 |
| 6,007,901 A | 12/1999 | Maschwitz et al. | 428/216 |
| 2002/0102352 A1* | 8/2002 | Hartig et al. | 427/165 |
| 2003/0165693 A1* | 9/2003 | Hartig et al. | 428/426 |
| 2003/0235719 A1* | 12/2003 | Grimal et al. | 428/698 |

FOREIGN PATENT DOCUMENTS

| | | |
|---|---|---|
| EP | 0 963 960 A | 12/1999 |
| WO | 01/44131 A | 6/2001 |

OTHER PUBLICATIONS

Specht, H., Gehlert, B., Warkentin, O., Schlott, M., Halden, T., "Ag-based coatings with improved weatherability and high reflectivity for reflective and transflective displays", SID 04 Digest, 2000 SID, 46.2, pp. 1-3, W. C. Heraeus GmbH & Co. KG, Hanau, Germany.

* cited by examiner

*Primary Examiner*—G. Blackwell
(74) *Attorney, Agent, or Firm*—Fredrikson & Byron, P.A.

(57) ABSTRACT

A corrosion-resistant low-emissivity coating is provided. The low-emissivity coating comprises, in sequence outwardly, a corrosion-resistant inner infrared-reflective layer, a transparent dielectric middle coat, and an outer infrared-reflective layer. The outer infrared-reflective layer consists essentially of silver and the corrosion-resistant inner infrared-reflective layer has a different composition than the outer infrared-reflective layer. Also provided are methods for depositing coatings of this nature, as well as substrates bearing these coatings.

39 Claims, 3 Drawing Sheets

CORROSION-RESISTANT LOW-EMISSIVITY COATINGS

CROSS REFERENCE To RELATED APPLICATION

The present application claims priority to provisional U.S. patent application filed Jun. 10, 2003 and assigned Ser. No. 60/477,302, the entire disclosure of which is incorporated herein by reference.

FIELD OF THE INVENTION

The present invention provides coatings for glass and other substrates. More specifically, this invention provides low-emissivity coatings. The invention also provides methods for depositing coatings of this nature, as well as substrates bearing these coatings.

BACKGROUND OF THE INVENTION

Low-emissivity coatings for glass and other substrates are well known in the present art. Typically, they include one or more infrared-reflective layers each positioned between two or more transparent dielectric layers. The infrared-reflective layers reduce the transmission of radiant heat through the coating (e.g., by reflecting infrared radiation). These infrared-reflective layers typically comprise conductive metals, such as silver, gold, or copper. The transparent dielectric layers are used primarily to reduce visible reflectance and to control other coating properties, such as color. Commonly used transparent dielectrics include oxides of zinc, tin, and titanium, as well as nitrides, such as silicon nitride.

In most cases, each infrared-reflective layer in a low-emissivity coating comprises silver. Silver is the most commonly used infrared-reflective material because it provides high electrical conductivity (and hence low-emissivity), high visible transmission, and neutral color. A drawback of using silver for each infrared-reflective layer is that silver lacks mechanical and chemical durability. Silver layers are very soft and thus limit the mechanical durability of silver-based coatings. Silver layers are also particularly vulnerable to becoming corroded. Thus, great care must be exercised to prevent silver-based coatings from being damaged. For example, consider manufacturing periods (e.g., prior to and/or during assembly of coated substrates into IG units). During these periods, coated substrates are frequently subjected to relatively harsh conditions. For example, the conditions associated with handling, shipping, and washing can cause silver-based coatings to become scratched or otherwise abraded. During manufacturing periods, coated substrates are also commonly exposed to air, moisture, and other chemicals, all of which can cause silver to become corroded. Thus, when pure silver layers are used in a low-emissivity coating, the overall durability of the coating tends to be less than ideal.

Attempts have been made to enhance the durability of infrared-reflective layers. For example, some have replaced the inner and outer silver layers with layers of a more durable reflective metal. Others have replaced the inner and outer silver layers with layers of a silver alloy comprising a small amount of a more durable reflective metal. For example, alloys of silver and palladium have reportedly been found to create infrared-reflective layers with greater durability than pure silver. These alternatives, however, have largely been rejected in the marketplace, as they are predominately viewed as yielding unacceptably high emissivity. Therefore, pure silver is typically used for each infrared-reflective layer in a low-emissivity coating, notwithstanding its mechanical and chemical vulnerability.

The properties of an infrared-reflective silver layer depend upon the surface over which it is deposited. For example, a silver layer can be grown to have particularly low emissivity by depositing the silver layer directly over a film of pure zinc oxide. Thus, it is a widespread practice in the art to position each infrared-reflective silver layer in a low-emissivity coating directly over a pure zinc oxide layer.

While zinc oxide is beneficial for growing a high quality silver film, it has several drawbacks. One known drawback is that, because zinc oxide is a highly crystalline film, it is not particularly dense. Thus, pure zinc oxide layers tend to be less than ideal for preventing air, moisture, sodium ions, and other materials from migrating through the zinc oxide layers and potentially reaching and reacting with the silver layers. Further, when zinc oxide is deposited by sputtering, it tends to exhibit pinholes more frequently than would be ideal. Great care is taken to avoid pinholes, as they can also give air, moisture, and other chemicals access to the silver layers. Another drawback of zinc oxide is that thick zinc oxide layers tend to exhibit more stress than is preferred. This can result in less than optimal adhesion, hence creating the potential for delamination. Notwithstanding these drawbacks, it is conventional in the art to provide pure zinc oxide directly beneath each silver layer in a low-emissivity coating.

It would be desirable to provide a low-emissivity coating that achieves better durability than conventional low-emissivity coatings wherein each infrared-reflective layer is pure silver. It would be particularly desirable to provide a coating that achieves this result without an undue increase in emissivity.

SUMMARY OF THE INVENTION

The present invention is directed to a substrate bearing a low-emissivity coating. The coating comprises, in sequence outwardly (i.e., moving away from the substrate), a corrosion-resistant inner infrared-reflective layer, a transparent dielectric middle coat, and an outer infrared-reflective layer. The outer infrared-reflective layer consists essentially of silver and the corrosion-resistant inner infrared-reflective layer has a different composition than the outer infrared-reflective layer. Preferably, the transparent middle coat comprises a layer consisting essentially of zinc oxide positioned directly beneath the outer infrared-reflective layer. This zinc oxide layer typically has a thickness of at least about 40 Å.

In some cases, the inner infrared-reflective layer comprises a corrosion-resistant silver alloy. Preferably, the alloy comprises a major portion of silver and a minor portion of a durable metal, the durable metal being a metal other than silver. Perhaps optimally, atoms of the durable metal account for less than about 10 atomic percent of the total number of metal atoms in the inner infrared-reflective layer. Preferably, the durable metal is a metal selected from the group consisting of platinum, palladium, copper, nickel, gold, indium, zinc, silicon, boron and beryllium.

In other cases, the corrosion-resistant inner infrared-reflective layer comprises an electrically conductive nitride. The electrically-conductive nitride is preferably a nitride selected from the group consisting of chromium nitride, zirconium nitride, titanium nitride, and niobium nitride.

In certain embodiments, the low-emissivity coating further comprises a transparent dielectric base coat between the substrate and the corrosion-resistant inner infrared-reflective layer. This transparent base coat typically comprises a durable transparent dielectric layer positioned directly beneath the corrosion-resistant inner-infrared reflective layer. Preferably, the durable transparent dielectric layer comprises a desired metal other than zinc. This desired metal can be a metal selected from the group consisting of tin, aluminum, bismuth, indium, titanium, niobium, and silicon. In some cases, the durable transparent dielectric layer comprises both zinc and the desired metal. For example, the durable transparent dielectric layer can comprise a major portion of zinc oxide and a minor portion of an oxide of the desired metal. Perhaps optimally, the durable transparent dielectric layer comprises zinc tin oxide and/or zinc aluminum oxide. In some cases, atoms of the desired metal account for less than about 10 atomic percent of the total metal atoms in the durable transparent dielectric layer. In some embodiments, the low-emissivity coating further comprises a transparent dielectric outer coat further from the substrate than the outer infrared-reflective layer.

In certain particularly preferred embodiments, the invention provides a substrate bearing a low-emissivity coating comprising, in sequence outwardly, a transparent base layer, a transparent dielectric base coat, a corrosion-resistant inner infrared-reflective layer, a transparent dielectric middle coat, and an outer infrared-reflective layer. In these embodiments, the outer infrared-reflective layer consists essentially of silver and the corrosion-resistant inner infrared-reflective layer has a different composition than the outer infrared-reflective layer. Here, the silicon dioxide is deposited directly over the substrate. Conjointly, the transparent dielectric base coat comprises at least one transparent dielectric film. Further, the transparent dielectric middle coat includes at least five transparent dielectric intermediate layers. Preferably, though not necessarily, the silicon dioxide has a thickness of less than 100 Å. In some preferred embodiments, each of the transparent dielectric intermediate layers has a thickness of less than 200 Å. In some cases, all the preferred features described in this paragraph are provided in combination and the transparent dielectric middle coat includes a layer consisting essentially of zinc oxide directly beneath the outer infrared-reflective layer and the transparent dielectric base coat includes a durable transparent dielectric layer directly beneath the corrosion-resistant inner infrared-reflective layer, the durable transparent dielectric layer comprising a desired metal, the desired metal being a metal other than zinc. In certain related methods, each layer/film described in this paragraph is deposited by a conventional sputtering method.

The invention also provides methods of producing coated substrates, e.g., by depositing a low-emissivity coating on a substrate. Typically, the method comprises providing a substrate having a surface, and depositing the low-emissivity coating onto this surface. Preferably, this involves depositing a low-emissivity coating comprising, moving outwardly from the substrate, a corrosion-resistant inner infrared-reflective layer, a transparent dielectric middle coat, and an outer infrared-reflective layer. Typically, the outer infrared-reflective layer is deposited as a film consisting essentially of silver and the inner infrared-reflective layer is deposited as a film having a different composition than the outer infrared-reflective layer. Preferably, the deposition of the transparent dielectric middle coat includes depositing a layer consisting essentially of zinc oxide directly beneath the outer infrared-reflective layer. In some cases, this zinc oxide layer is deposited at a thickness of at least about 40 angstroms. In certain favored methods, the middle coat is formed by deposited at least five intermediate films (as described). In some of the present embodiments, the inner infrared-reflective layer is deposited as a film comprising a corrosion-resistant silver alloy. For example, the inner infrared-reflective layer can be deposited as a film comprising a major portion of silver and a minor portion of a durable metal, the durable metal being a metal other than silver. Here, the inner infrared-reflective layer is preferably deposited as a film wherein atoms of the durable metal account for less than about 10 atomic percent relative to the total number of metal atoms in the inner infrared-reflective layer. In some cases, the inner infrared-reflective layer is deposited as a film comprising silver and a durable metal selected from the group consisting of platinum, palladium, copper, nickel, gold, indium, zinc, silicon, boron, and beryllium. The inner infrared-reflective layer can alternatively be deposited as a film comprising an electrically-conductive nitride. When this is done, the deposition of the middle coat can optionally include depositing an oxide or nitride layer directly over the electrically-conductive nitride of the inner infrared-reflective layer. In some cases, the inner infrared-reflective layer is deposited as a film comprising an electrically-conductive nitride selected from the group consisting of chromium nitride, zirconium nitride, titanium nitride, and niobium nitride. If so desired, the present method can further comprise depositing a transparent dielectric base coat between the substrate and the corrosion-resistant inner infrared-reflective layer, the transparent dielectric base coat including a durable transparent dielectric layer directly beneath the corrosion-resistant inner infrared-reflective layer, the durable transparent dielectric layer comprising a desired metal, the desired metal being a metal other than zinc. For example, the durable transparent dielectric layer can be deposited as a film comprising a desired metal selected from the group consisting of tin, aluminum, bismuth, indium, titanium, niobium, and silicon Preferably, the durable transparent dielectric layer is deposited as a film comprising zinc and the desired metal. For example, the durable transparent dielectric layer can be deposited as a film comprising a major portion of zinc oxide and a minor portion of an oxide of the desired metal. In some cases, the durable transparent dielectric layer is deposited as a film wherein atoms of the desired metal account for less than about 10 atomic percent relative to the total number of metal atoms in the durable transparent dielectric layer. Perhaps optimally, the durable transparent dielectric layer is deposited as a film comprising zinc tin oxide and/or zinc aluminum oxide. In some cases, the method further comprises depositing a transparent dielectric outer coat further from the substrate than the outer infrared-reflective layer. Preferably, each layer in the coating is deposited on the substrate by sputtering.

DETAILED DESCRIPTION OF PREFERRED EMBODIMENTS

Figure 1:
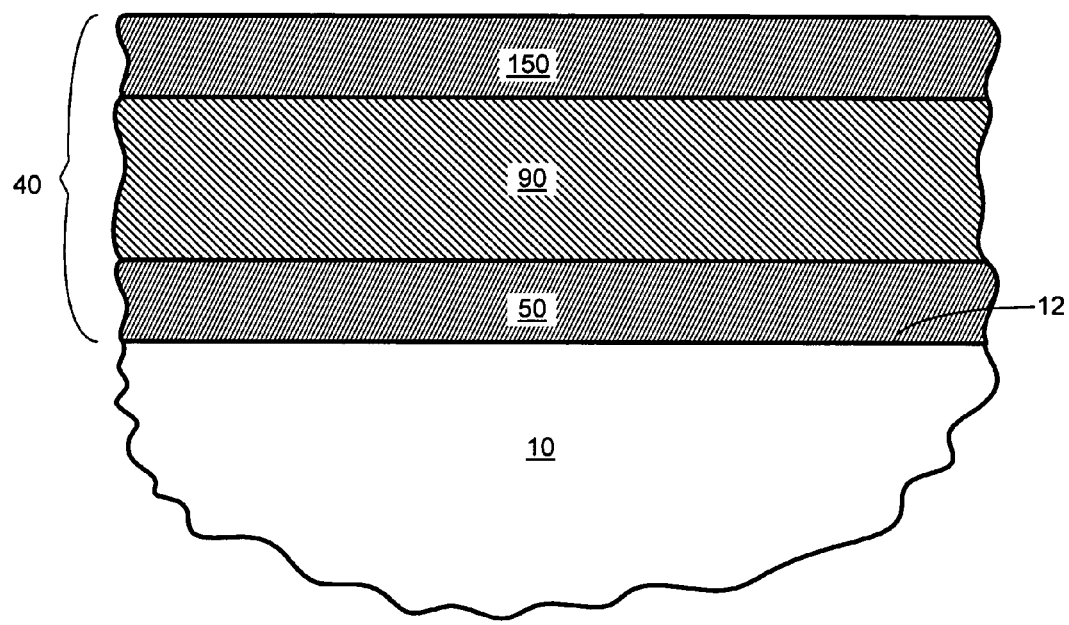
FIG. 1 is a schematic cross-sectional view of a coating in accordance with certain embodiments of the present invention.

The following detailed description is to be read with reference to the Figures, in which like elements in different Figures have like reference numerals. The Figures, which are not necessarily to scale, depict selected embodiments and are not intended to limit the scope of the invention. Skilled artisans will recognize that the examples provided herein have many useful alternatives that fall within the scope of the invention.

The present invention provides a corrosion-resistant low-emissivity coating for glass and other substrates. It has been discovered that the outer infrared-reflective layer in a "double-type" low-emissivity coating has a far greater impact on the total emissivity of the coating than does the inner infrared-reflective layer. In fact, the impact of the inner infrared-reflective layer on the coating's emissivity is surprisingly small. Thus, in a coating of the present invention, the inner infrared-reflective silver layer is replaced with a layer of a more durable (particularly more corrosion resistant) infrared-reflective material. Surprisingly, the present coating achieves a substantial increase in overall coating durability (particularly in corrosion resistance) with very little increase in overall coating emissivity.

The invention provides a substrate 10 bearing a corrosion-resistant low-emissivity coating 40. A variety of substrates are suitable for use in the present invention. In most cases, the substrate is a sheet of transparent material (i.e., a transparent sheet). However, the substrate is not required to be transparent. For example, opaque substrates may be useful in some cases. However, it is anticipated that for most applications, the substrate will comprise a transparent or translucent material, such as glass or clear plastic. In many cases, the substrate will be a glass pane. A variety of known glass types can be used, and soda-lime glass is expected to be preferred.

FIG. 1 depicts an alternate embodiment of the present coating 40, wherein the coating comprises, in sequence outwardly (i.e., moving away from the substrate) a corrosion-resistant inner infrared-reflective layer 50, a transparent dielectric middle coat 90, and an outer infrared-reflective layer 150. Thus, the outer infrared-reflective layer 150 is further from the substrate 10 than the transparent dielectric middle coat 90, and the transparent dielectric middle coat 90 is further from the substrate 10 than the corrosion-resistant inner infrared-reflective layer 50. These layers need not be provided in a contiguous sequence, as will be apparent in view of the ensuing discussion.

Figure 2:
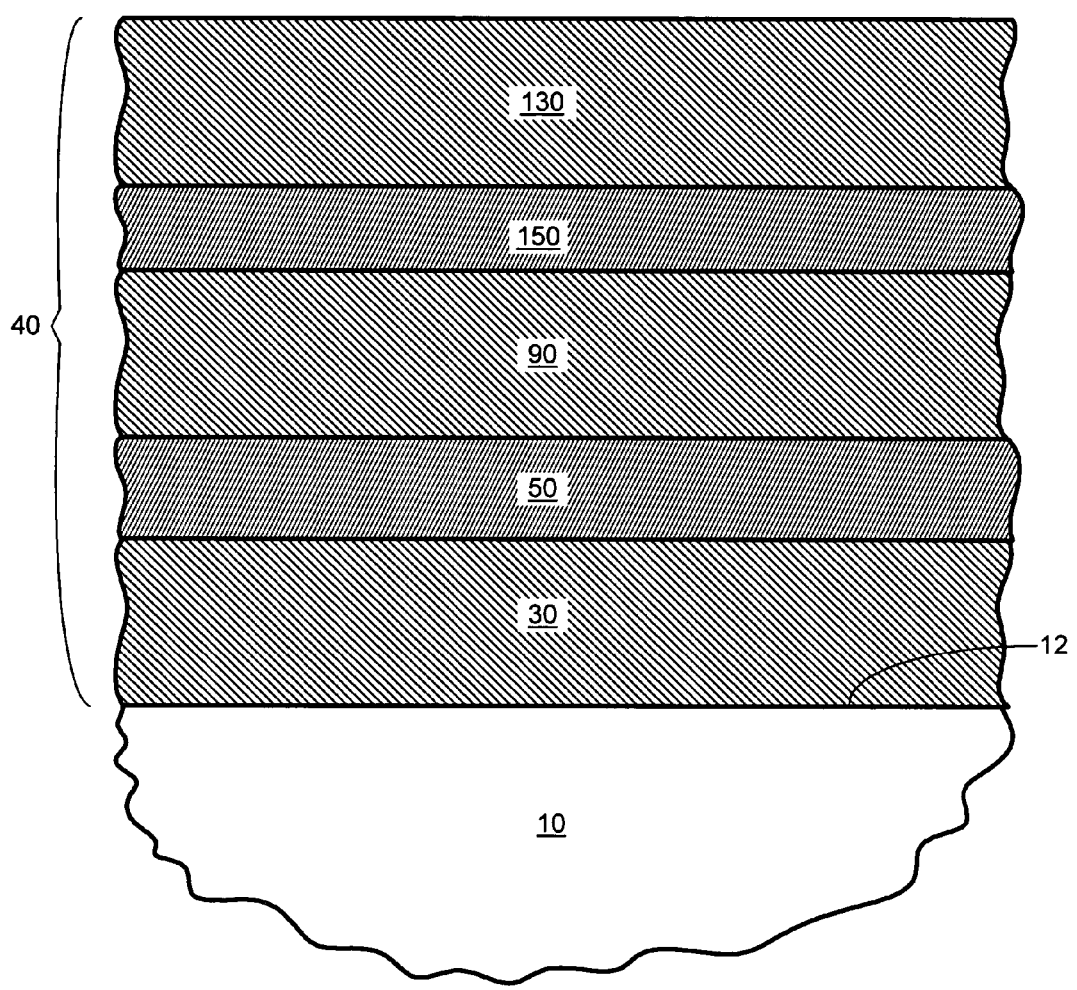
FIG. 2 is a schematic cross-sectional view of a coating in accordance with certain embodiments of the invention.

FIG. 2 depicts certain preferred embodiments wherein the coating 40 further comprises a base coat 30 and an outer coat 130. While the base 30 and outer 130 coats are optional, both are preferred. Thus, in certain preferred embodiments, the coating 40 comprises, in sequence outwardly, a transparent dielectric base coat 30, a corrosion-resistant inner infrared-reflective layer 50, a transparent dielectric middle coat 90, an outer infrared-reflective layer 150, and a transparent dielectric outer coat 130. Again, these layers need not be contiguous.

Figure 3:
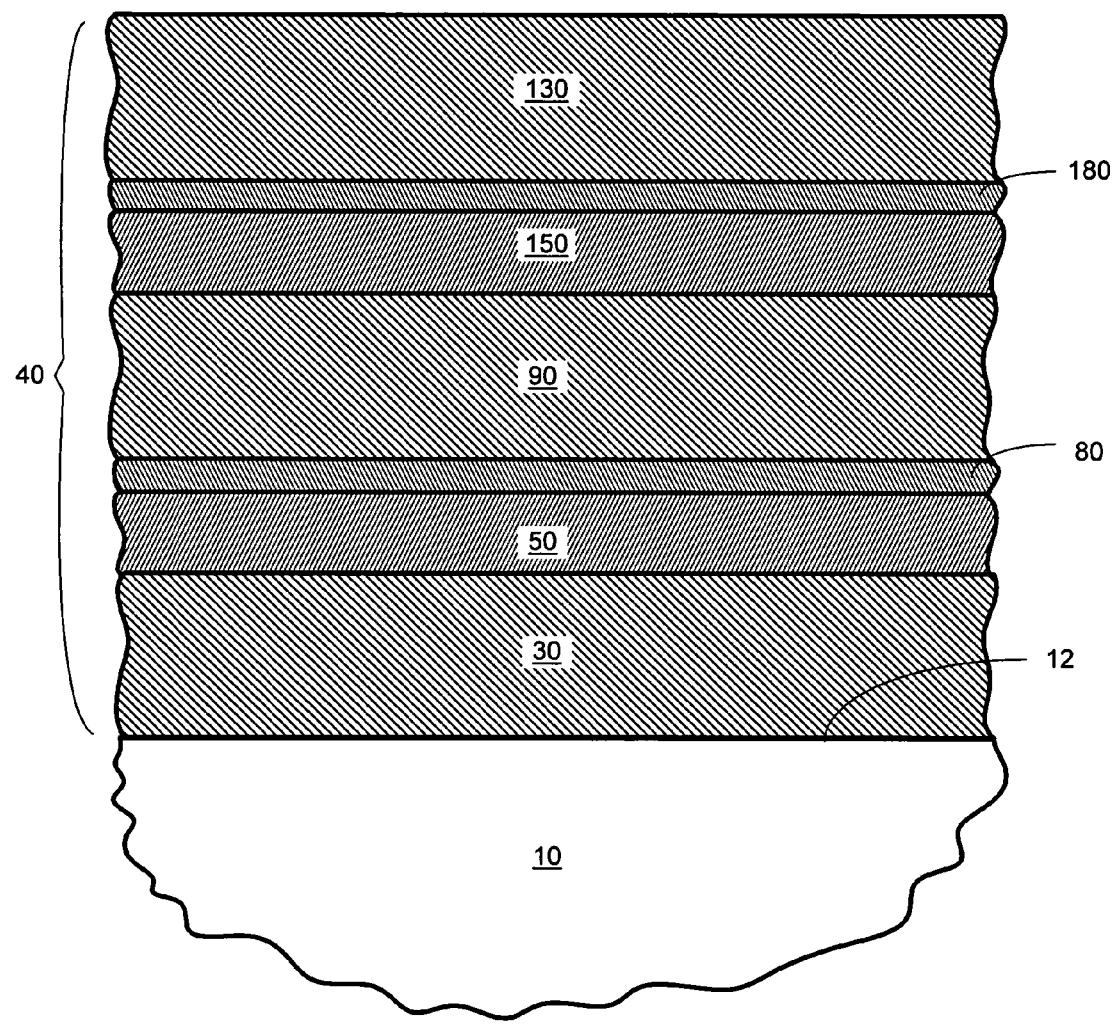
FIG. 3 is a schematic cross-sectional view of a coating in accordance with certain embodiments of the invention.

For example, FIG. 3 depicts certain preferred embodiments wherein the coating 40 further comprises protective layers 80 and 180 positioned over the infrared-reflective layers 50 and 150, respectively. In these preferred embodiments, the coating 40 comprises, in sequence outwardly, a transparent dielectric base coat 30, a corrosion-resistant inner infrared-reflective layer 50, a first protective layer 80, a transparent dielectric middle coat 90, an outer infrared-reflective layer 150, a second protective layer 180, and a transparent dielectric outer coat 130. Here again, the layers are not required to be contiguous. Rather, other layers can be interposed among these layers, if so desired. In certain embodiments, though, these layers are provided in a contiguous sequence.

While certain preferred embodiments are detailed in this disclosure, it will be apparent to skilled artisans that the present low-emissivity coating 40 can be provided in many different layer structures each comprising the corrosion-resistant infrared-reflective layer 50, the transparent dielectric middle coat 90, and the outer infrared-reflective layer 150.

In the present coating 40, the inner infrared-reflective layer 50 has a different composition (i.e., is formed of a different material) than the outer infrared-reflective layer 150. In particular, the outer infrared-reflective layer 150 consists essentially of silver, whereas the inner infrared-reflective layer 50 does not. Instead, the inner infrared-reflective layer comprises at least one metal (i.e., the "durable" metal) other than silver. In some embodiments, the inner infrared-reflective layer 50 comprises a corrosion-resistant silver alloy. In other embodiments, the inner infrared-reflective layer 50 comprises an electrically conductive nitride. Embodiments of both types are particularly preferred.

Thus, in some embodiments, the inner infrared-reflective layer 50 comprises a corrosion-resistant silver alloy. Here, silver is provided in combination with (i.e., in an alloy comprising) at least one durable metal. The durable metal can be a metal selected from the group consisting of platinum, palladium, copper, nickel, gold, indium, zinc, silicon, boron, and beryllium. Preferably, the inner infrared-reflective layer 50 comprises a major portion (i.e., at least 50 atomic percent) of silver and a minor portion (i.e., less than 50 atomic percent) of the durable metal. For example, atoms of the durable metal preferably account for less than about ten atomic percent of the metal atoms in the inner infrared-reflective layer 50. In other words, the percentage of the durable metal atoms relative to the total number of metal atoms in this layer 50 preferably is less than about 10%. Perhaps optimally, the atomic percentage of the durable metal is less than about 1% (e.g., between about 0.001% and about 1.0%). In embodiments wherein the inner infrared-reflective layer 50 comprises silver and more than one durable metal, the combined atomic percentage of the durable metals is preferably within one or more of the foregoing ranges. Thus, in certain preferred embodiments, the inner infrared-reflective layer 50 comprises at least about 90 atomic percent (and perhaps optimally at least about 99 atomic percent) silver and at least one durable metal at an atomic percentage of less than about 10% (and perhaps optimally less than about one atomic percent).

In certain preferred embodiments, the inner infrared-reflective layer 50 comprises a corrosion-resistant silver alloy selected from the group consisting of silver-copper, silver-nickel, and silver-titanium. In these embodiments, silver preferably is present in a major atomic percentage (i.e., at least 50%, desirably at least about 90%, and perhaps optimally at least about 99%). While these silver alloys are advantageous, the inner infrared-reflective layer 50 is not required to comprise any particular silver alloy.

In one particular embodiment, the corrosion-resistant inner infrared-reflective layer 50 comprises silver and copper (e.g., is a silver-copper alloy). In this embodiment, the inner infrared-reflective layer 50 preferably comprises a major portion of silver and a minor portion of copper. Useful silver-copper alloys are described in U.S. Pat. No. 4,462,883, the entire contents of which are incorporated herein by reference. Here, the alloy contains 1% to 30% copper with the remainder being silver. Preferred silver-copper alloys are described in U.S. Pat. No. 4,883,721, the entire contents of which are incorporated herein by reference. In this patent, the alloy contains 5% to 10% copper with the remainder being silver. These particular alloys are preferred to silver-copper alloys that comprise more than 10% copper. Thus, in certain preferred methods, a metal alloy target formed of silver and 1%-10% copper is sputtered (e.g., in an inert atmosphere) to deposit the inner infrared-reflective layer 50. Accordingly, it will be appreciated that in certain embodiments, the inner infrared-reflective layer 50 consists essentially of silver and copper.

In other embodiments, the corrosion-resistant inner infrared-reflective layer 50 comprises (e.g., is an alloy of) silver and palladium. In these embodiments, the inner infrared-reflective layer 50 preferably comprises a major portion of silver and a minor portion of palladium. Useful silver-palladium alloys are described in U.S. Pat. No. 6,280,811, the entire contents of which are incorporated herein by reference. Here, the major portion of silver is between about 85 atomic percent and about 99.9 atomic percent and the minor portion of palladium is between about 0.1 atomic percent and about 15 atomic percent. Preferably, the major portion of silver is between about 89 atomic percent and about 99 atomic percent and the minor portion of palladium is between about 1 atomic percent and about 11 atomic percent. Thus, in certain preferred methods, a metal alloy target formed of between about 1 atomic percent and about 11 atomic percent palladium (with the remainder being silver) is sputtered (e.g., in an inert atmosphere) to deposit the inner infrared-reflecting layer 50. Accordingly, it will be appreciated that in certain embodiments, the inner infrared-reflective layer 50 consists essentially of silver and palladium.

In some embodiments, the corrosion-resistant inner infrared-reflective layer 50 comprises (e.g., is an alloy of) silver, palladium, copper, and indium or zinc. In these embodiments, the inner infrared-reflective layer 50 preferably comprises a major atomic percentage of silver. Useful alloys of these metals are described in U.S. Pat. No. 5,037,708, the entire contents of which are incorporated herein by reference. Preferably, this alloy comprises 80% to 92.5% by weight silver, 4% to 9% by weight palladium, 2% to 10% by weight copper, and 0.5% to 1% by weight indium or zinc. Thus, in certain preferred methods, the layer 50 is deposited by sputtering (e.g., in an inert atmosphere) a metal alloy target formed of 80% to 92.5% by weight silver, 4% to 9% by weight palladium, 2% to 10% by weight copper, and 0.5% to 1% by weight indium or zinc. Accordingly, it will be appreciated that in certain embodiments, the inner infrared-reflective layer 50 consists essentially of silver, palladium, copper, and indium or zinc.

In other embodiments, the corrosion-resistant inner infrared-reflective layer 50 comprises (e.g., is an alloy of) silver and gold. In these embodiments, the inner infrared-reflective layer 50 preferably comprises a major portion of silver and a minor portion of gold. Useful silver-gold alloys are described in U.S. Pat. No. 6,280,811, the entire contents of which are incorporated herein by reference. Preferably, this alloy comprises between about 90 atomic percent and about 99.9 atomic percent silver and between about 0.1 atomic percent and about 10 atomic percent gold. More preferably, the major portion of silver is between about 91.5 atomic percent and about 95 atomic percent and the minor portion of gold is between about 5 atomic percent and 9.5 atomic percent. Thus, in certain more preferred methods, the layer 50 is deposited by sputtering (e.g., in an inert atmosphere) a metal alloy target formed of between about 91.5 atomic percent and about 95 atomic percent silver and between about 5 atomic percent and about 9.5 atomic percent gold. Accordingly, it will be appreciated that in certain embodiments, the inner infrared-reflective layer 50 consists essentially of silver and gold.

In some embodiments, the corrosion-resistant inner infrared-reflective layer 50 comprises (e.g. is an alloy of) silver, gold, and palladium. In these embodiments, the inner infrared-reflective layer 50 preferably comprises a major portion of silver and minor portions of gold and palladium. Useful alloys of this nature are described in U.S. Pat. No. 6,280,811, the entire contents of which are incorporated herein by reference. Preferably, this alloy comprises between about 75 atomic percent and about 99.8 atomic percent silver, between about 0.1 atomic percent and about 10 atomic percent gold, and between about 0.1 atomic percent and about 15 atomic percent palladium. More preferably, the major portion of silver is between about 80.5 atomic percent and about 94 atomic percent, the minor portion of gold is between about 5 atomic percent and about 9.5 atomic percent, and the minor portion of palladium is between about 1 atomic percent and about 10 atomic percent. Thus, in certain more preferred methods, the layer 50 is deposited by sputtering (e.g., in an inert atmosphere) a metal alloy target formed of between about 80.5 atomic percent and about 94 atomic percent silver, between about 5 atomic percent and about 9.5 atomic percent gold, and between about 1 atomic percent and about 10 atomic percent palladium. Accordingly, it will be appreciated that, in certain embodiments, the inner infrared-reflective layer 50 consists essentially of silver, gold, and palladium.

In other embodiments, the corrosion-resistant inner infrared-reflective layer 50 comprises (e.g., is an alloy of) silver and beryllium. In these embodiments, the inner infrared-reflective layer 50 preferably comprises a major portion of silver and a minor portion of beryllium. Useful alloys of this type are described in U.S. Pat. No. 6,280,811, the entire contents of which are incorporated herein by reference. Preferably, this alloy comprises between about 90 atomic percent and about 99.99 atomic percent silver and between about 0.01 atomic percent and about 10 atomic percent beryllium. More preferably, the major portion of silver is between about 94 atomic percent and about 99.9 atomic percent and the minor portion of beryllium is between about 0.1 atomic percent and about 6 atomic percent. Thus, in certain more preferred methods, the layer 50 is deposited by sputtering (e.g., in an inert atmosphere) a metal alloy target formed of between about 94 atomic percent and about 99.9 atomic percent silver and between about 0.1 atomic percent and about 6 atomic percent beryllium. Accordingly, in certain embodiments, the inner infrared-reflective layer 50 consists essentially of silver and beryllium.

In some embodiments, the corrosion-resistant inner infrared-reflective layer 50 comprises (e.g., is an alloy of) silver, zinc, copper, and silicon. Useful alloys of this nature are described in U.S. Pat. No. 5,882,441, the entire contents of which are incorporated herein by reference. Preferably, this alloy comprises 90% to 94% by weight silver, 3.50% to 7.35% by weight zinc, 1% to 3% by weight copper, and 0.1% to 2.5% by weight silicon. Thus, in certain preferred methods, the layer 50 is deposited by sputtering (e.g., in an inert atmosphere) a metal alloy target formed of 90% to 94% by weight silver, 3.50% to 7.35% by weight zinc, 1% to 3% by weight copper, and 0.1% to 2.5% by weight silicon. Accordingly, in certain embodiments, the inner infrared-reflective layer 50 consists essentially of silver, zinc, copper, and silicon.

In some embodiments, the corrosion-resistant inner infrared-reflective layer 50 comprises (e.g., is an alloy of) silver, zinc, copper, nickel, silicon, and indium. Useful alloys of this nature are described in U.S. Pat. No. 5,817,195, the entire contents of which are incorporated herein by reference. Preferably, this alloy comprises 90% to 92.5% by weight silver, 5.75% to 7.5% by weight zinc, 0.25% to less than 1% by weight copper, 0.25% to 0.5% by weight nickel, 0.1% to 0.25% by weight silicon, and 0.0% to 0.5% by weight indium. Thus, in certain preferred methods, the layer 50 is deposited by sputtering (e.g., in an inert atmosphere) a metal alloy target formed of 90% to 92.5% by weight silver, 5.75% to 7.5% by weight zinc, 0.25% to less than 1% by weight copper, 0.25% to 0.5% by weight nickel, 0.1% to 0.25% by weight silicon, and 0.0% to 0.5% by weight indium. Accordingly, it will be appreciated that in certain embodiments, the layer 50 consists essentially of silver, zinc, copper, nickel, silicon, and indium.

In some embodiments, the corrosion-resistant inner infrared-reflective layer 50 comprises (e.g., is an alloy of) silver, silicon, boron, zinc, copper, tin, and indium. Useful alloys of this nature are described in U.S. Pat. No. 5,039,479, the entire contents of which are incorporated herein by reference. Preferably, this alloy comprises about 89% to 93.5% silver, about 0.02% to 2% silicon, about 0.001% to 2% boron, about 0.5% to 5% zinc, about 0.5% to 6% copper, about 0.25% to 6% tin, and about 0.01% to 1.25% indium. Thus, in certain preferred methods, the layer 50 is deposited by sputtering (e.g., in an inert atmosphere) a metal alloy target formed of about 89% to 93.5% silver, about 0.02% to 2% silicon, about 0.001% to 2% boron, about 0.5% to 5% zinc, about 0.5% to 6% copper, about 0.25% to 6% tin, and about 0.01% to 1.25% indium. Accordingly, it will be appreciated that in certain embodiments, the inner infrared-reflective layer 50 consists essentially of silver, silicon, boron, zinc, copper, tin, and indium.

In other embodiments, the corrosion-resistant infrared-reflective layer 50 comprises an electrically-conductive nitride. Preferred conductive nitrides include chromium nitride, zirconium nitride, titanium nitride, and niobium nitride. These nitrides are both reflective and electrically conductive. The use of a conductive nitride for the inner infrared-reflective layer 50 is particularly desirable, as the chemical stability of the overall coating is greatly increased. When the inner infrared-reflective layer is formed of a metallic film, it tends to oxidize when exposed to reactive oxygen. Nitride films tend to not oxidize as readily as metallic films. Therefore, in these embodiments, the coating 40 is particularly chemically stable, and will remain chemically stable over a particularly long period of time.

In embodiments wherein a conductive nitride is used for the inner infrared-reflective layer 50, it is advantageous to omit the blocker layer 80 that may otherwise be positioned over the inner infrared-reflective layer 50. This blocker layer 80 can be advantageously omitted in these embodiments since the inner infrared-reflective layer 50 is formed of a relatively non-reactive nitride, rather than a highly reactive silver layer. Thus, a transparent dielectric film can be deposited (e.g., as an oxide or nitride) directly over the inner infrared-reflective layer 50.

As noted above, in certain embodiments, the inner infrared-reflective layer 50 comprises at least one durable metal. The durable metal is a metal other than silver. For example, the durable metal can be platinum, palladium, copper, nickel, gold, indium, zinc, silicon, boron, and beryllium. In some alternate embodiments, the inner infrared-reflective layer 50 comprises one of these durable metals. For example, the inner infrared-reflective layer 50 can be a film consisting essentially of a nickel-based alloy that is corrosion resistant. Examples of corrosion-resistant nickel alloys include nichrome and nickel-aluminum. The term "nichrome" is used in its generic sense to designate a layer comprising some combination of nickel and chromium (e.g., 80% by weight nickel and 20% by weight chromium).

The inner infrared-reflective layer 50 preferably has a thickness of between about 50 Å and about 250 Å, more preferably between about 50 Å and about 180 Å, and perhaps optimally between about 65 Å and about 180 Å. Preferably, the outer infrared-reflective layer 150 is somewhat thicker than the inner infrared-reflective layer 50. For example, certain embodiments provide the inner infrared-reflective layer 50 at a thickness of between about 50 Å and about 150 Å, more preferably between about 58 Å and about 90 Å, and perhaps optimally about 80 Å, in combination with an outer infrared-reflective layer 150 at a thickness of between about 90 Å and about 180 Å, more preferably between about 96 Å and 155 Å, and perhaps optimally about 130 Å.

As noted above, the outer infrared-reflective layer 150 consists essentially of silver (e.g., is pure or essentially pure silver). Preferably, this layer 150 is deposited as metallic silver. For example, the outer infrared-reflective layer 150 can be deposited by sputtering a metallic silver target in an argon atmosphere at a pressure of between about $3 \times 10^{-3}$ mbar and about $8 \times 10^{-3}$ mbar. The outer infrared-reflective layer 150 preferably has a thickness of between about 50 Å and about 250 Å, more preferably between about 50 Å and about 180 Å, and perhaps optimally between about 65 Å and about 180 Å. By forming the outer infrared-reflective layer 150 of silver, the present coating 40 is provided with exceptionally low emissivity, surprisingly even though the inner infrared-reflective layer 50 is not formed of pure silver.

To minimize the emissivity of the outer infrared-reflective layer 150, this layer 150 is preferably (though not necessarily) positioned directly over a zinc oxide layer. Thus, the transparent dielectric middle coat 90 preferably includes a layer consisting essentially of zinc oxide directly beneath the outer infrared-reflective layer 150. This facilitates the growth of silver having particularly low emissivity and particularly high visible transmission. The zinc oxide layer is preferably deposited as pure (or essentially pure) zinc oxide. For example, this layer can be deposited by sputtering a metallic zinc target in an argon/oxygen atmosphere at a pressure of between about $4 \times 10^{-3}$ mbar and about $8 \times 10^{-3}$ mbar. The thickness of this zinc oxide layer is desirably at least about 30 Å, more preferably at least about 34 Å, and perhaps optimally at least about 40 Å (e.g., between about 40 Å and about 250 Å). These minimum thicknesses are preferred to achieve the desired low emissivity and high visible transmission. However, it is not necessary to form the entire transparent dielectric middle coat 90 of zinc oxide. Rather, the middle coat 90 preferably (though not necessarily) comprises a plurality of transparent dielectric layers.

The number of layers in the middle coat 90 can be varied as desired. As noted above, the layer directly beneath the outer infrared-reflective silver layer 150 preferably consists essentially of zinc oxide. In certain embodiments, the middle coat 90 consists of a single layer of zinc oxide. In these embodiments, the zinc oxide layer typically has a thickness in the range of about 150-1200 Å. However, it is advantageous to include at least one amorphous or substantially amorphous layer (e.g., silicon nitride) in the middle coat 90. Amorphous layers are advantageous in that they typically do not to experience major crystal growth when tempered or otherwise heat treated. As a result, they tend not to develop objectionable haze due to large crystal growth during heat treatment. Further, amorphous layers tend to be relatively dense and thus provide a good barrier to oxygen, nitrogen, moisture, and other materials that may become somewhat mobile in the coating 40. Therefore, it is desirable to provide a middle coat 90 that includes at least one amorphous layer in combination with a layer of pure zinc oxide directly beneath the outer infrared-reflective silver layer 150. Exemplary middle coats 190 of this nature are described below.

Thus, in certain embodiments, the middle coat 90 comprises at least two transparent dielectric layers. Whether the middle coat 90 consists of one or multiple transparent dielectric layers, the optical thickness (i.e., the product of refractive index and physical thickness) of the middle coat 90 preferably is about 300-2400 Å. In one embodiment, the middle coat 90 comprises a silicon nitride layer and a zinc oxide layer, with the zinc oxide layer positioned over (i.e., outwardly from) the silicon nitride layer and directly beneath the outer infrared-reflective silver layer 150. It is preferred to limit the thickness (e.g., to less than 200 Å) of each silicon nitride layer in the coating 40 to avoid undue stress. This is preferred because silicon nitride tends to have significant stress and because this stress tends to become more problematic as the thickness of each silicon nitride layer is increased. Particularly advantageous middle coat 90 designs are disclosed in U.S. patent application Ser. No. 09/728,435, the entire contents of which are incorporated herein by reference.

Thus, in certain embodiments, the middle coat 90 comprises a plurality of transparent dielectric layers. For example, it is often preferred to form the middle coat 90 of at least three separate layers. In certain embodiments, the middle coat 90 includes a silicon nitride layer positioned between two zinc oxide layers. In one embodiment of this nature, the middle coat 90 comprises, moving outwardly from the optional first blocker layer 80: (1) zinc oxide at a thickness of about 150-250 Å, perhaps optimally about 220 Å; (2) silicon nitride at a thickness of about 40-120 Å, perhaps optimally about 80-100 Å; and (3) zinc oxide at a thickness of about 150-250 Å, perhaps optimally about 210 Å. It is not required that these three intermediate layers be contiguous. However, the middle coat 190 can advantageously consist of a contiguous sequence of these three layers.

In certain preferred embodiments, the middle coat 90 comprises at least five transparent dielectric intermediate layers. In some embodiments of this nature, each of the transparent dielectric intermediate layers has a thickness of less than 200 Å. Perhaps optimally, each transparent dielectric intermediate layer has a thickness of about 195 Å or less. In some cases, the middle coat comprises alternating oxide and nitride layers. In such cases, it is preferred for each intermediate nitride layer to have a smaller thickness than each intermediate oxide layer. Preferably, the thickness of each intermediate nitride layer is less than about 180 Å, while the thickness of each intermediate oxide layer may range up to about 195 Å. In one embodiment, the middle coat comprises alternating layers of a first, polycrystalline oxide (or suboxide) and a second, substantially amorphous nitride. As one example, alternating layers of zinc oxide and silicon nitride can be used (e.g., three layers of zinc oxide, two layers of silicon nitride). In one embodiment, the middle coat 90 comprises, moving outwardly from the optional first blocker layer 80: (1) a first intermediate layer formed of zinc oxide at a thickness of about 50-200 Å, perhaps optimally about 105 Å; (2) a second intermediate layer formed of silicon nitride at a thickness of about 50-200 Å, perhaps optimally about 140 Å; (3) a third intermediate layer formed of zinc oxide at a thickness of about 50-300 Å, perhaps optimally about 200 Å; (4) a fourth intermediate layer formed of silicon nitride at a thickness of about 50-200 Å, perhaps optimally about 140 Å; and (5) a fifth intermediate layer formed of zinc oxide at a thickness of about 50-200 Å, perhaps optimally about 80 Å. While these five intermediate layers need not be contiguous, the middle coat can advantageously comprise a contiguous sequence of these five layers.

In certain particularly advantageous embodiments, the low-emissivity coating comprises, in sequence outwardly, a transparent base layer, a transparent dielectric base coat, a corrosion-resistant inner infrared-reflective layer, a transparent dielectric middle coat, and an outer infrared-reflective layer. In these embodiments, the outer infrared-reflective layer consists essentially of silver and the corrosion-resistant inner infrared-reflective layer has a different composition (described above) than the outer infrared-reflective layer. In these embodiments, the silicon dioxide is deposited directly over the substrate. Preferably, though not necessarily, the silicon dioxide has a thickness of less than 100 Å (optimally between about 50 Å and about 90 Å). The transparent dielectric base coat, which is deposited over the silicon dioxide, comprises at least one transparent dielectric film. In the present embodiments, the transparent dielectric middle coat includes at least five transparent dielectric intermediate layers. In some cases, each of the transparent dielectric intermediate layers has a thickness of less than 200 Å. In certain uniquely preferred embodiments, all the preferred features described in this paragraph are provided in combination, and the transparent dielectric middle coat includes a layer consisting essentially of zinc oxide directly beneath the outer infrared-reflective layer and the transparent dielectric base coat includes a durable transparent dielectric layer directly beneath the corrosion-resistant inner infrared-reflective layer, the durable transparent dielectric layer comprising a desired metal (described below), the desired metal being a metal other than zinc. In certain related methods, each layer/film described in this paragraph is deposited by a conventional sputtering method.

To maximize the durability of the present coating 40, the corrosion-resistant inner infrared-reflective layer 50 is preferably (though not necessarily) positioned directly over a durable transparent dielectric layer comprising a metal other than zinc (preferably in a transparent dielectric compound that includes zinc and at least one other metal). Thus, the layer directly beneath the corrosion-resistant inner infrared-reflective layer 50 preferably is not pure zinc oxide. This goes against conventional wisdom, as pure zinc oxide is strongly favored for use directly beneath each infrared-reflective layer in a low-emissivity coating. Surprisingly, the resulting durability, stress, and density benefits far outweigh the drawback of slightly increased emissivity.

Preferably, the layer directly beneath the corrosion-resistant inner infrared-reflective layer 50 comprises at least some tin, aluminum, bismuth, indium, titanium, niobium, and/or silicon. Of these desired metals, tin and aluminum are particularly preferred, and tin is uniquely preferred. In certain preferred embodiments, this layer comprises an oxide of zinc in combination with (e.g., in a transparent dielectric compound also comprising) an oxide of at least one other metal. For example, in certain particularly preferred embodiments, the inner infrared-reflective layer 50 is deposited directly over a durable transparent dielectric layer comprising a major portion of zinc oxide and a minor portion of an oxide of another metal (e.g., one of the "additional" or "desired" metals listed above in this paragraph). Preferably, atoms of the additional metal account for less than about ten atomic percent relative to the total number of metal atoms in the durable transparent dielectric layer. The additional metal oxide will slightly increase the emissivity of the inner infrared-reflective layer 50, as compared to the emissivity of the layer 50 if it were deposited directly over pure zinc oxide. However, the impact of the inner infrared-reflective layer 50 on the total emissivity of the coating 40 is surprisingly small compared to the impact of the outer infrared-reflective layer 150. Therefore, the use of a small amount of another metal oxide in a compound comprising zinc oxide will barely be detectable in terms of increased coating emissivity. Moreover, when the additional metal oxide is tin oxide or aluminum oxide (or a mixture thereof), the emissivity increase will be particularly small.

In the embodiments depicted in FIG. 2, the coating 40 includes all the elements of FIG. 1 and further includes a base coat 30 and an outer coat 130. As noted above, the base coat 30 and the outer coat 130 are optional, though preferred, in the present coating 40. In certain embodiments, the base coat 30 is provided directly over the surface 12 of the substrate 10. In other uniquely preferred cases, a transparent base layer (not shown) is formed directly over the surface 12 of the substrate 10 and the base coat 30 is formed directly over the transparent base layer. In embodiments of this nature, the transparent base layer is a silicon dioxide film having a thickness of less than 100 Å (optimally between about 50 Å and about 90 Å). Particularly advantageous transparent base layers are described in U.S. patent application Ser. No. 10/087,662, the entire contents of which are incorporated herein by reference.

In its simplest form, the preferred base coat 30 consists of a single transparent dielectric layer. When only a single layer is used, the base coat 30 is preferably a durable transparent dielectric layer of the type described above. Thus, in certain preferred embodiments, the base coat 30 is a single transparent dielectric layer comprising an oxide of zinc and at least one other metal. For example, the single transparent dielectric layer can comprise at least some tin, aluminum, bismuth, indium, titanium, niobium, and/or silicon. In certain embodiments of this nature, the base coat 30 is a single zinc tin oxide layer, or a single zinc aluminum oxide layer, positioned directly beneath the corrosion-resistant inner infrared-reflective layer 50.

In other embodiments, the base coat 30 comprises a plurality of transparent dielectric layers. When a plurality of transparent dielectric layers are used, the layer directly beneath the corrosion-resistant inner infrared-reflective layer 50 preferably is a durable transparent dielectric layer of the type described above. Thus, in certain preferred embodiments, the base coat 30 comprises multiple transparent dielectric layers including at least one durable transparent dielectric layer comprising a metal other than zinc, (e.g., comprising at least some tin, aluminum, bismuth, indium, titanium, niobium, and/or silicon). In certain preferred embodiments of this nature, the base coat 30 includes at least one durable transparent dielectric layer comprising zinc tin oxide and/or zinc aluminum oxide. In these embodiments, the durable transparent dielectric layer preferably is directly beneath the inner infrared-reflective layer 50.

The base coat 30 can comprise any number of transparent dielectric layers. Whether the base coat 30 consists of one or multiple transparent dielectric layers, the optical thickness of the base coat 30 preferably is between about 150 Å and about 1200 Å. The term "transparent dielectric" is used herein to refer to any non-metallic (i.e., neither a pure metal nor a metal alloy) compound that comprises any one or more metals and is substantially transparent when applied as a thin film. Included in this definition would be any metal oxide, metal nitride, metal carbide, metal sulfide, metal boride, etc. (and any combinations thereof, such as oxynitrides). Exemplary metal oxides include oxides of zinc, tin, indium, bismuth, titanium, hafnium, zirconium, and mixtures thereof. Metal oxides tend to be advantageous due to their ease and low cost of application. However, metal nitrides (e.g., silicon nitride) can also be used quite advantageously. The term "metal" is to be understood to include all metals and semi-metals (i.e., metalloids), such as silicon.

With continued reference to FIG. 2, the present coating 40 preferably includes an outer coat 130 positioned further from the substrate 10 than the outer infrared-reflective layer 150. The preferred outer coat 130 comprises at least one transparent dielectric layer. In its simplest form, the preferred outer coat 130 consists of a single transparent dielectric layer. A wide variety of transparent dielectric films can be used as the outermost layer of the present coating 40. Preferably, a chemically and mechanically durable material is used when the outer coat 130 is a single layer. For example, certain embodiments employ an outer coat 130 formed by a single layer of silicon nitride, titanium dioxide, or tin oxide, each of which offers relatively good chemical and mechanical durability.

In certain embodiments, the outer coat 130 comprises a plurality of transparent dielectric layers. Whether the outer coat 130 consists of one or multiple transparent dielectric layers, the optical thickness of the outer coat 130 preferably is between about 150 Å and about 1200 Å. A variety of film stacks are well known by skilled artisans to be suitable for use as the outer coat of a low-emissivity coating, and any such film stack can be used as the outer coat 130 of the present coating 40.

It may be preferable to limit each layer of the outer coat 130, as well as each layer of the base 30 and middle 90 coats, to a physical thickness of no more than about 250 Å, more preferably no more than about 225 Å, and perhaps optimally less than 200 Å. Moreover, it is preferred if each layer in the outer coat 130, as well as each layer in the base 30 and middle 90 coats, is formed of a different material than each layer contiguous thereto. As described in U.S. patent application Ser. No. 09/728,435, this is believed to reduce the likelihood that objectionable haze will develop in the coating during heat treatment.

In certain embodiments (not shown), the outer coat 130 comprises at least two transparent dielectric layers. For example, a first outer layer can be deposited directly upon the optional second blocker layer 180 and a second outer layer can be deposited directly upon this first outer layer. The first outer layer can be formed of any desired transparent dielectric material, such as zinc oxide. The thickness of the first outer layer is preferably between about 25 Å and about 300 Å, more preferably between about 50 Å and about 275 Å, and perhaps optimally between about 70 Å and about 250 Å. The second outer layer can be formed of any desired transparent dielectric material, although it is preferably formed of material having good chemical and mechanical durability. For example, this layer can be advantageously formed of silicon nitride. The thickness of the second outer layer is preferably between about 25 Å and about 300 Å, more preferably between about 50 Å and about 275 Å, and perhaps optimally between about 70 Å and about 250 Å. In one preferred embodiment, the first outer layer is formed of zinc oxide at a thickness of about 175 Å and the second outer layer is formed of silicon nitride at a thickness of about 75 Å. In another preferred embodiment, the first outer layer is formed of zinc oxide at a thickness of about 225 Å and the second outer layer is formed of silicon nitride at a thickness of about 96 Å.

In the embodiments depicted in FIG. 3, the coating 40 includes all the elements of FIG. 2 and further includes protective (or "barrier" or "blocker") layers 80, 180 positioned directly over the infrared-reflective layers 50 and 150, respectively. The protective layers 80, 180 are preferred, though not strictly required, in the coating 40.

The protective layers 80, 180 are preferably provided to protect the underlying infrared-reflective layers from chemical attack and to provide resistance to deterioration (e.g., oxidation) of the infrared-reflective layers during deposition of subsequent layers and/or during heat treatment. An additional or alternative purpose for each protective layer may be to enhance the adhesion of the next-applied layer to the underlying infrared-reflective film. Moreover, the protective layers 80, 180 can be provided as stress-reducing layers in some embodiments (e.g., wherein the protective layers comprise nickel-chromium compounds). Further, the thickness of the protective layers 80, 180 can be varied to adjust the color and/or shading properties of the coating 40.

Each protective layer can be deposited as a layer comprising a metal selected from the group consisting of titanium, niobium, nickel, and chromium. Further, skilled artisans may wish to select other known materials for use in the protective layers 80, 180. The protective layers 80, 180 are preferably each applied at a thickness of about 7-30 Å, more preferably about 15-22 Å, and perhaps optimally about 20 Å.

Any conventional method can be used to deposit the layers of the present coating 40. Preferably, each layer is deposited by sputtering. Sputtering techniques and equipment are well known in the present art. For example, magnetron sputtering chambers and related equipment are commercially available from a variety of sources (e.g., Leybold and BOC Coating Technology). Useful magnetron sputtering techniques and equipment are also disclosed in U.S. Pat. No. 4,166,018 (Chapin), the entire teachings of which are incorporated herein by reference.

Generally speaking, magnetron sputtering involves providing at least one target formed of material to be deposited upon a substrate. In this process, a clean substrate (e.g., glass) is placed in a coating chamber, which is evacuated (commonly to a pressure of less than $10^{-4}$ torr, more commonly to less than $2 \times 10^{-5}$ torr). Typically, the target is provided with a negative charge and a relatively positively charged anode is positioned adjacent the target. By introducing a relatively small amount of a desired gas into the chamber (commonly at a pressure ranging between about 1-30 mtorr), a plasma of that gas can be established. Particles (e.g., ions) in the plasma collide with the target, ejecting target material from the target and sputtering it onto the substrate. To facilitate this process, it is known to position magnets behind the target to shape and focus the plasma about a sputtering surface of the target.

In certain embodiments, the invention provides methods of producing coated substrates, e.g., by depositing a corrosion-resistant low-emissivity coating onto a substrate. The method typically comprises providing a substrate having a desired surface (e.g., a major surface) and depositing a low-emissivity coating of the type described above onto the desired surface. Typically, the method comprises depositing upon the desired surface a low-emissivity coating comprising, in sequence outwardly, an optional base coat 30, a corrosion-resistant inner infrared-reflective layer 50, an optional first blocker layer 80, a transparent dielectric middle coat 90, an outer infrared-reflective layer 150, an optional second blocker layer 180, and an optional outer coat 130. The method comprises depositing the outer infrared-reflective layer 150 as a film consisting essentially of silver and depositing the corrosion-resistant inner infrared-reflective layer 50 as a film having a different composition than the outer infrared-reflective layer 150. Preferably, the corrosion-resistant inner infrared-reflective layer 50 is deposited as a film comprising at least one metal other than silver. For example, this layer 150 can be advantageously deposited as a film comprising at least one durable metal selected from the group consisting of platinum, palladium, copper, nickel, gold, indium, zinc, silicon, boron, and beryllium. In more detail, the inner infrared-reflective layer 50 can be advantageously deposited as a corrosion-resistant silver alloy, e.g., comprising a major atomic percentage of silver and a minor atomic percentage of at least one metal other than silver). Each layer in the low-emissivity coating 40 preferably is deposited by sputtering.

One exemplary coating 40 will now be described. Directly upon a major surface of a glass sheet was deposited a zinc tin oxide layer. This zinc tin oxide layer had a thickness of about 147 Å. Directly upon this layer of zinc tin oxide was deposited a silver alloy layer comprising silver and palladium. The silver alloy layer had a thickness of about 60-70 Å. Directly upon the silver alloy layer was deposited a layer of titanium. This titanium layer was deposited at a thickness of about 17-23 Å. Directly, upon this layer of titanium was deposited a layer of zinc oxide. This zinc oxide layer was deposited in an oxidizing atmosphere and therefore the underlying titanium layer was partially oxidized. This zinc oxide layer had a thickness of about 175 Å. Directly upon this layer of zinc oxide was deposited a layer of silicon nitride. This silicon nitride layer had a thickness of about 70 Å. Directly upon this layer of silicon nitride was deposited another layer of zinc oxide. This zinc oxide layer had a thickness of about 130-140 Å. Directly upon this layer of zinc oxide was deposited another layer of silicon nitride. This silicon nitride layer had a thickness of about 105 Å. Directly upon this layer of silicon nitride was deposited another layer of zinc oxide. This layer of zinc oxide had a thickness of about 187 Å. Directly upon this zinc oxide layer was deposited a layer of silver. The layer of silver had a thickness of about 117 Å. Directly upon the layer of silver was deposited another layer of zinc oxide. This zinc oxide layer had a thickness of about 175 Å. Finally, directly upon this zinc oxide layer was deposited a layer of silicon nitride. This silicon nitride layer (which was the outermost layer of the coating) had a thickness of about 75 Å.

Another exemplary coating 40 will now be described. Directly upon a major surface of a glass sheet was deposited a layer of silicon dioxide. The silicon dioxide layer had a thickness of about 60 Å. Directly upon the layer of silicon dioxide was deposited a layer of zinc tin oxide. This layer of zinc tin oxide had a thickness of about 140 Å. Directly upon this layer of zinc tin oxide was deposited a silver alloy layer comprising silver and palladium. The silver alloy layer had a thickness of about 71 Å. Directly upon the silver alloy layer was deposited a protective layer of niobium. This protective layer of niobium had a thickness of about 18 Å. Directly upon this protective layer of niobium was deposited a layer of zinc oxide. This layer of zinc oxide was deposited at a thickness of about 105 Å. Directly upon this layer of zinc oxide was deposited a layer of silicon nitride. This silicon nitride layer had a thickness of about 124 Å. Directly upon this layer of silicon nitride was deposited another layer of zinc oxide. This zinc oxide layer was deposited at a thickness of about 124 Å. Directly upon this layer of zinc oxide was deposited another layer of silicon nitride. This silicon nitride layer had a thickness of about 124 Å. Directly upon this layer of silicon nitride was deposited another layer of zinc oxide. This zinc oxide layer had a thickness of about 113 Å. Directly upon this layer of zinc oxide was deposited a layer of silver. The silver layer had a thickness of about 116 Å. Directly upon on the layer of silver was deposited a protective layer of niobium. This layer of niobium had a thickness of about 18 Å. Directly upon this layer of niobium was deposited a layer of zinc oxide. This layer of zinc oxide had a thickness of about 100 Å. Directly upon this layer of zinc oxide was deposited a layer of silicon nitride. This layer of silicon nitride had a thickness of about 40 Å. Directly upon this layer of silicon nitride was deposited a layer of titanium nitride. The layer of titanium nitride had a thickness of about 16 Å. Directly upon the layer of titanium nitride was deposited a layer of silicon nitride. This layer of silicon nitride (which was the outermost layer of the coating) had a thickness of about 122 Å.

While there have been described what are believed to be preferred embodiments of the present invention, those skilled in the art will recognize that other and further changes and modifications can be made without departing from the spirit of the invention, and all such changes and modifications should be understood to fall within the scope of the invention.

What is claimed is:

1. A substrate bearing a low-emissivity coating comprising, in sequence outwardly, a corrosion-resistant inner infrared-reflective layer having a thickness of between about 50 Å and about 150 Å, a transparent dielectric middle coat, and an outer infrared-reflective layer having a thickness of between about 90 Å and about 180 Å, wherein the outer infrared-reflective layer is thicker than the corrosion-resistant inner infrared-reflective layer, wherein the outer infrared-reflective layer consists essentially of silver and the corrosion-resistant inner infrared-reflective layer comprises either an electrically-conductive nitride or a corrosion-resistant silver alloy, wherein the corrosion-resistant silver alloy comprises silver and a durable metal, wherein the durable metal is a metal selected from the group consisting of platinum, palladium, nickel, indium, zinc, silicon, boron, beryllium, and titanium.

2. The substrate of claim 1 wherein the electrically-conductive nitride is selected from the group consisting of chromium nitride, zirconium nitride, titanium nitride, and niobium nitride.

3. The substrate of claim 1 wherein the inner infrared-reflective layer comprises the electrically-conductive nitride and the transparent dielectric middle coat includes an oxide or nitride layer deposited directly over the electrically-conductive nitride.

4. The substrate of claim 1 wherein the coating includes a transparent dielectric outer coat further from the substrate than the outer infrared-reflective layer.

5. The substrate of claim 1 wherein the corrosion-resistant inner infrared-reflective layer has a thickness of between about 58 Å and about 90 Å and the outer infrared-reflective layer has a thickness of between about 96 Å and about 155 Å.

6. The substrate of claim 1 wherein the corrosion-resistant silver alloy is an alloy selected from the group consisting of an alloy comprising silver and nickel, an alloy comprising silver and titanium, an alloy comprising silver and palladium, an alloy comprising silver, palladium, copper, and indium, an alloy comprising silver, palladium, copper, and zinc, an alloy comprising silver, gold, and palladium, an alloy comprising silver and beryllium, and alloy comprising silver, zinc, copper, and silicon, an alloy comprising silver, zinc, copper, nickel, silicon, and indium, and an alloy comprising silver, silicon, boron, zinc, copper, tin, and indium.

7. The substrate of claim 1 wherein the transparent dielectric middle coat includes a layer consisting essentially of zinc oxide directly beneath the outer infrared-reflective layer.

8. The substrate of claim 7 wherein said zinc oxide layer has a thickness of at least about 40 angstroms.

9. The substrate of claim 1 wherein the corrosion-resistant silver alloy comprises a major portion of the silver and a minor portion of the durable metal.

10. The substrate of claim 9 wherein atoms of the durable metal account for less than about 10 atomic percent relative to the total number of metal atoms in the inner infrared-reflective layer.

11. The substrate of claim 1 wherein the transparent dielectric middle coat includes at least five transparent dielectric intermediate layers.

12. The substrate of claim 11 wherein each of the transparent dielectric intermediate layers has a thickness of less than 200 Å.

13. The substrate of claim 12 wherein each of the transparent dielectric intermediate layers has a thickness of about 195 Å or less.

14. The substrate of claim 11 wherein the transparent dielectric middle coat comprises alternating oxide and nitride layers.

15. The substrate of claim 14 wherein the transparent dielectric middle coat comprises alternating layers of a first, polycrystalline oxide and a second, substantially amorphous nitride.

16. The substrate of claim 15 wherein each intermediate nitride layer has a smaller thickness than each intermediate oxide layer.

17. The substrate of claim 16 wherein the thickness of each intermediate nitride layer is less than about 180 Å and the thickness of each intermediate oxide layer is less than 200 Å.

18. The substrate of claim 1 wherein the coating includes a transparent dielectric base coat between the substrate and the corrosion-resistant inner infrared-reflective layer, the transparent dielectric base coat including a durable transparent dielectric layer directly beneath the corrosion-resistant inner infrared-reflective layer, the durable transparent dielectric layer comprising a desired metal, the desired metal being a metal other than zinc.

19. The substrate of claim 18 wherein the durable transparent dielectric layer comprises zinc and the desired metal.

20. The substrate of claim 19 wherein the desired metal is a metal selected from the group consisting of tin, aluminum, bismuth, indium, titanium, niobium, and silicon.

21. The substrate of claim 18 wherein the durable transparent dielectric layer comprises a major portion of zinc oxide and a minor portion of an oxide of the desired metal.

22. The substrate of claim 21 wherein atoms of the desired metal account for less than about 10 atomic percent relative to the total number of metal atoms in the durable transparent dielectric layer.

23. The substrate of claim 18 wherein the durable transparent dielectric layer comprises zinc tin oxide and/or zinc aluminum oxide.

24. The substrate of claim 18 wherein the coating further comprises a transparent base layer between the substrate and the transparent dielectric base coat, the transparent base layer comprising silicon dioxide deposited directly over the substrate.

25. The substrate of claim 24 wherein the silicon dioxide has a thickness of less than 100 Å.

26. The substrate of claim 25 wherein the silicon dioxide has a thickness of between about 50 Å and about 100 Å.

27. A substrate bearing a low-emissivity coating comprising, in sequence outwardly, a transparent base layer comprising silicon dioxide deposited directly over the substrate, a transparent dielectric base coat comprising at least one transparent dielectric film, a corrosion-resistant inner infrared-reflective layer, a transparent dielectric middle coat, and an outer infrared-reflective layer, wherein the outer infrared-reflective layer is thicker than the corrosion-resistant inner infrared-reflective layer, wherein the outer infrared-reflective layer has a thickness of between about 90 Å and about 180 Å and the inner infrared-reflective layer has a thickness of between about 50 Å and about 150 Å, wherein the outer infrared-reflective layer consists essentially of silver and the corrosion-resistant inner infrared-reflective layer comprises a corrosion-resistant silver alloy, wherein the corrosion-resistant silver alloy comprises silver and a durable metal, wherein the durable metal is a metal selected from the group consisting of platinum, palladium, nickel, indium, zinc, silicon, boron, beryllium and titanium.

28. The substrate of claim 27 wherein the transparent dielectric middle coat includes at least three transparent dielectric intermediate layers, wherein each of the transparent dielectric intermediate layers has a thickness of less than 200 Å.

29. The substrate of claim 28 wherein the silicon dioxide has a thickness of less than 100 Å.

30. The substrate of claim 29 wherein the transparent dielectric middle coat includes a layer consisting essentially of zinc oxide directly beneath the outer infrared-reflective layer and the transparent dielectric base coat includes a durable transparent dielectric layer directly beneath the corrosion-resistant inner infrared-reflective layer, the durable transparent dielectric layer comprising a desired metal, the desired metal being a metal other than zinc.

31. The substrate of claim 27 wherein the corrosion-resistant inner infrared-reflective layer has a thickness of between about 58 Å and about 90 Å and the outer infrared-reflective layer has a thickness of between about 96 Å and about 155 Å.

32. The substrate of claim 27 wherein the corrosion-resistant silver alloy is an alloy selected from the group consisting of an alloy comprising silver and nickel, an alloy comprising silver and titanium, an alloy comprising silver and palladium, an alloy comprising silver, palladium, copper, and indium, an alloy comprising silver, palladium, copper, and zinc, an alloy comprising silver, gold, and palladium, an alloy comprising silver and beryllium, and alloy comprising silver zinc, copper, and silicon, an alloy comprising silver, zinc, copper, nickel, silicon, and indium, and an alloy comprising silver, silicon, boron, zinc, copper, tin, and indium.

33. A glass sheet bearing a low-emissivity coating comprising, in sequence outwardly, a base coat comprising a durable transparent dielectric layer, a corrosion-resistant inner infrared-reflective layer, a transparent dielectric middle coat, an outer infrared-reflective layer, and an outer coat, wherein the outer infrared-reflective layer is thicker than the corrosion-resistant inner infrared-reflective layer, wherein the outer infrared-reflective layer has a thickness of between about 90 Å and about 180 Å and the corrosion-resistant inner infrared-reflective layer has a thickness of between about 50 Å and about 150 Å, wherein the outer infrared-reflective layer consists essentially of silver and the corrosion-resistant inner infrared-reflective layer comprises a corrosion-resistant silver alloy, wherein the corrosion-resistant silver alloy comprises silver and a durable metal, wherein the durable metal is a metal selected from the group consisting of platinum, palladium, nickel, indium, zinc, silicon, boron, beryllium, and titanium, wherein the corrosion-resistant inner infrared-reflective layer is directly over the durable transparent dielectric layer, and wherein the durable transparent dielectric layer comprises a durable transparent dielectric compound that includes zinc and at least one other metal.

34. The glass sheet of claim 33 wherein the durable transparent dielectric compound includes zinc and another metal selected from the group consisting of tin and aluminum.

35. The glass sheet of claim 33 wherein the base coat consists of the durable transparent dielectric layer, the durable transparent dielectric layer being a single zinc tin oxide layer or a single zinc aluminum oxide layer.

36. The glass sheet of claim 33 wherein each layer in the base coat, middle coat, and outer coat has a physical thickness of no more than about 250 Å.

37. The glass sheet of claim 33 wherein each layer in the base coat, middle coat, and outer coat has a physical thickness of less than 200 Å.

38. The glass sheet of claim 33 wherein the corrosion-resistant inner infrared-reflective layer has a thickness of between about 58 Å and about 90 Å and the outer infrared-reflective layer has a thickness of between about 96 Å and about 155 Å.

39. The glass sheet of claim 33 wherein the corrosion-resistant silver alloy is an alloy selected from the group consisting of an alloy comprising silver and nickel, an alloy comprising silver and titanium, an alloy comprising silver and palladium, an alloy comprising silver, palladium, copper, and indium, an alloy comprising silver, palladium, copper, and zinc, an alloy comprising silver, gold, and palladium, an alloy comprising silver and beryllium, and alloy comprising silver zinc, copper, and silicon, an alloy comprising silver, zinc, copper, nickel, silicon, and indium, and an alloy comprising silver, silicon, boron, zinc, copper, tin, and indium.

* * * * *